United States Patent [19]
Buechel et al.

[11] Patent Number: 6,131,707
[45] Date of Patent: Oct. 17, 2000

[54] DISC BRAKE ROTOR AND METHOD FOR PRODUCING SAME

[75] Inventors: John H. Buechel, Lincoln Park; Mohannad A. Labadi, Dearborn, both of Mich.

[73] Assignee: Kelsey-Hayes Company, Livonia, Mich.

[21] Appl. No.: 09/089,833

[22] Filed: Jun. 3, 1998

Related U.S. Application Data

[60] Provisional application No. 60/048,589, Jun. 4, 1997, and provisional application No. 60/049,843, Jun. 17, 1997.

[51] Int. Cl.$^7$ ..................................................... F16D 65/10
[52] U.S. Cl. ............................... 188/218 XL; 188/18 A; 188/73.35
[58] Field of Search ............................... 188/18 A, 18 R, 188/218 XL, 264 A, 264 AA, 73.35, 73.36, 71.5; 192/113.2, 113.26, 302

[56] References Cited

U.S. PATENT DOCUMENTS

| | | | |
|---|---|---|---|
| 2,835,355 | 5/1958 | Armstrong | 188/218 XL |
| 2,850,118 | 9/1958 | Byers | 188/71 |
| 5,004,078 | 4/1991 | Oono et al. | 188/218 XL |
| 5,139,117 | 8/1992 | Melinat | 188/218 XL |
| 5,238,089 | 8/1993 | Matsuzaki et al. | 188/18 A |
| 5,417,313 | 5/1995 | Matsuzaki et al. | 188/218 XL |
| 5,460,249 | 10/1995 | Aoki | 188/218 XL |
| 5,850,895 | 12/1998 | Evrard | 188/218 XL |

OTHER PUBLICATIONS

Society of Automotive Engineers Paper No. 930804, "Brake Noise Caused By Longitudinal Vibration Of The Disc Rotor", Mikio Matsuzaki and Toshitaka Izumihara, Abebono Research and Development Centre Ltd., pp. 125–132, 1993.

*Primary Examiner*—Robert J. Oberleitner
*Assistant Examiner*—Mariano Sy
*Attorney, Agent, or Firm*—MacMillan, Sobanski & Todd, LLC

[57] ABSTRACT

An improved structure for a brake rotor and method for producing the same wherein the brake rotor includes a mounting flange and a pair of opposed friction plates spaced apart from one another by a plurality of intermediate fins. The friction plates have generally parallel outwardly facing surfaces adapted to be frictionally engaged by a pair of brake pads of the disc brake assembly. Each of the friction plates defines an outer plate diameter and an inner plate diameter. At least one of the friction plates includes a pair of asymmetrically spaced apart cuts formed therein. The cuts extend radially inwardly from the outer plate diameter toward the inner plate diameter. One method for producing the brake rotor of this invention includes the steps (a) providing a rotor including a mounting flange and a pair of opposed friction plates spaced apart from one another by a plurality of intermediate fins, the friction plates having generally parallel outwardly facing surfaces adapted to be frictionally engaged by a pair of brake pads of the disc brake assembly; (b) positioning the rotor on a first cutting machine, the first cutting machine including a fixture for rotatably supporting the rotor and a cutting tool supported relative to the fixture and movable in a generally radial direction relative to the fixture, the cutting tool having a tool end; (c) operating the first cutting machine to machine a groove in the outwardly facing surfaces of the friction plates by selectively controlling the first cutting machine to produce a finish machined rotor; (d) positioning the rotor on a second cutting machine; and (e) operating the second cutting machine to machine a pair of asymmetrically spaced apart cuts in at least one of the friction plates.

16 Claims, 13 Drawing Sheets

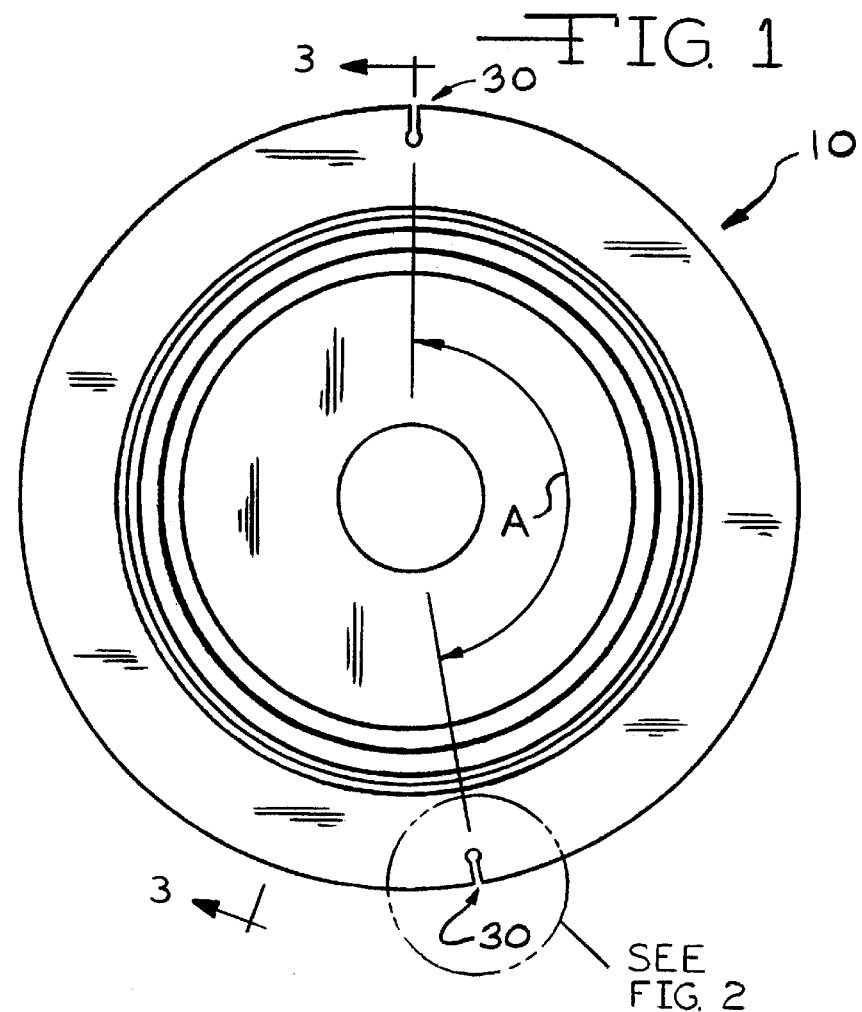
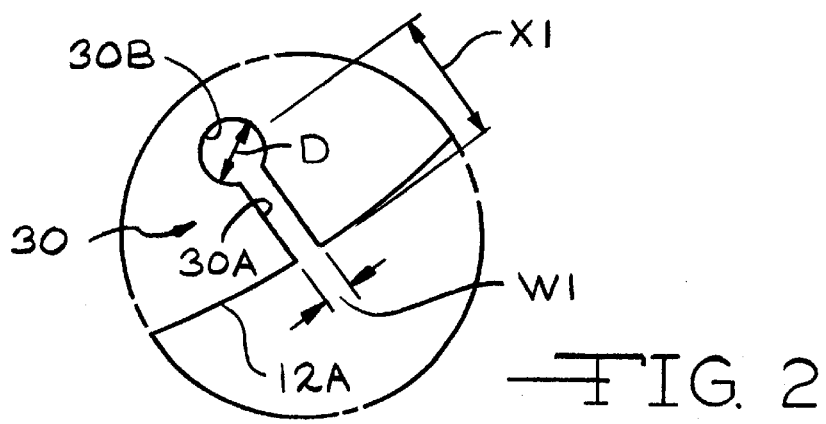

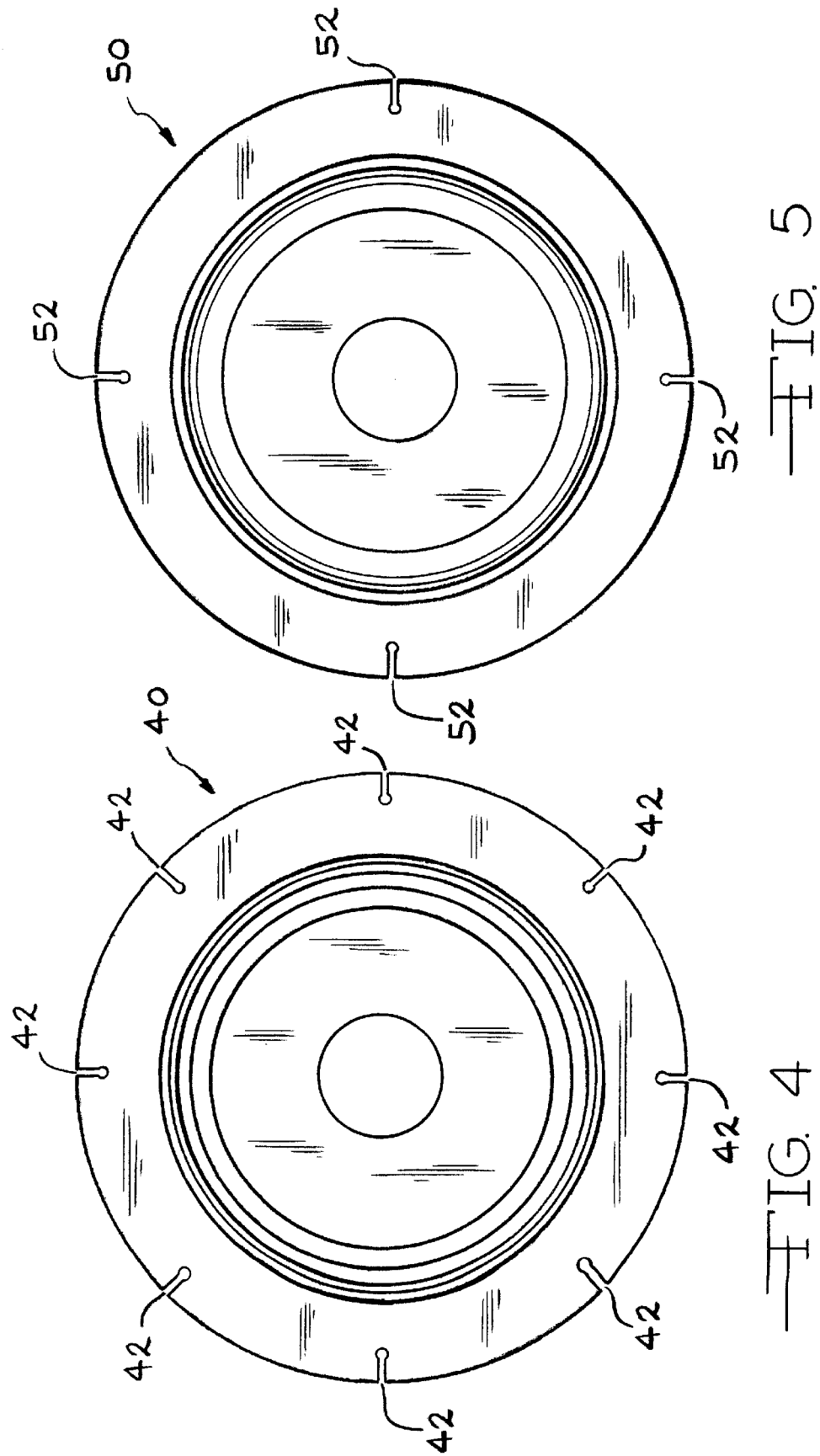

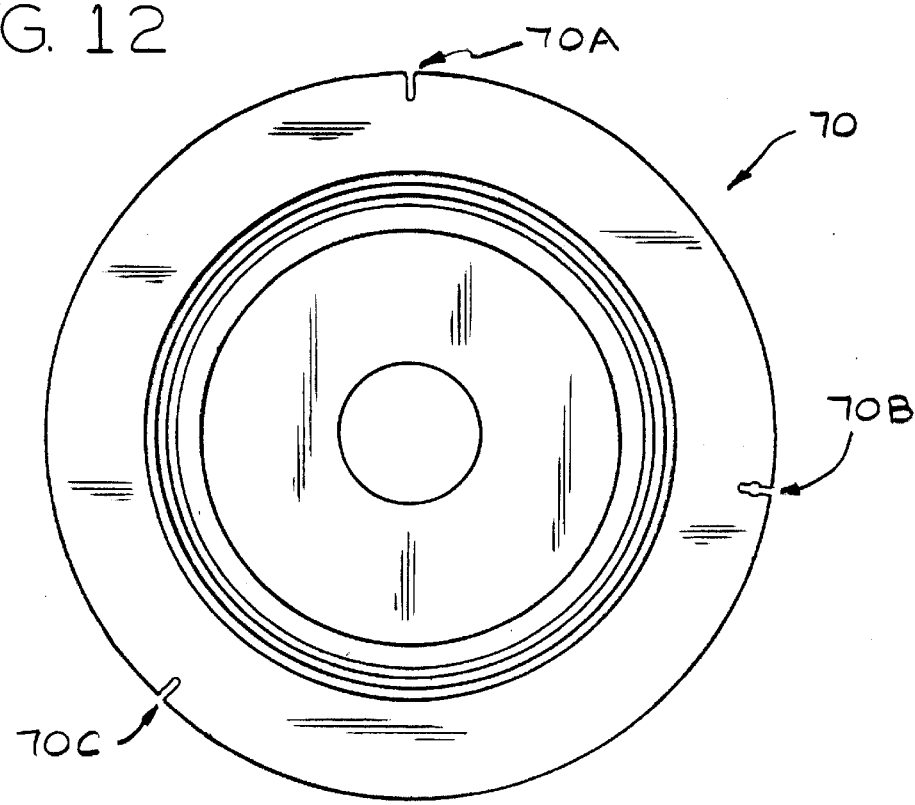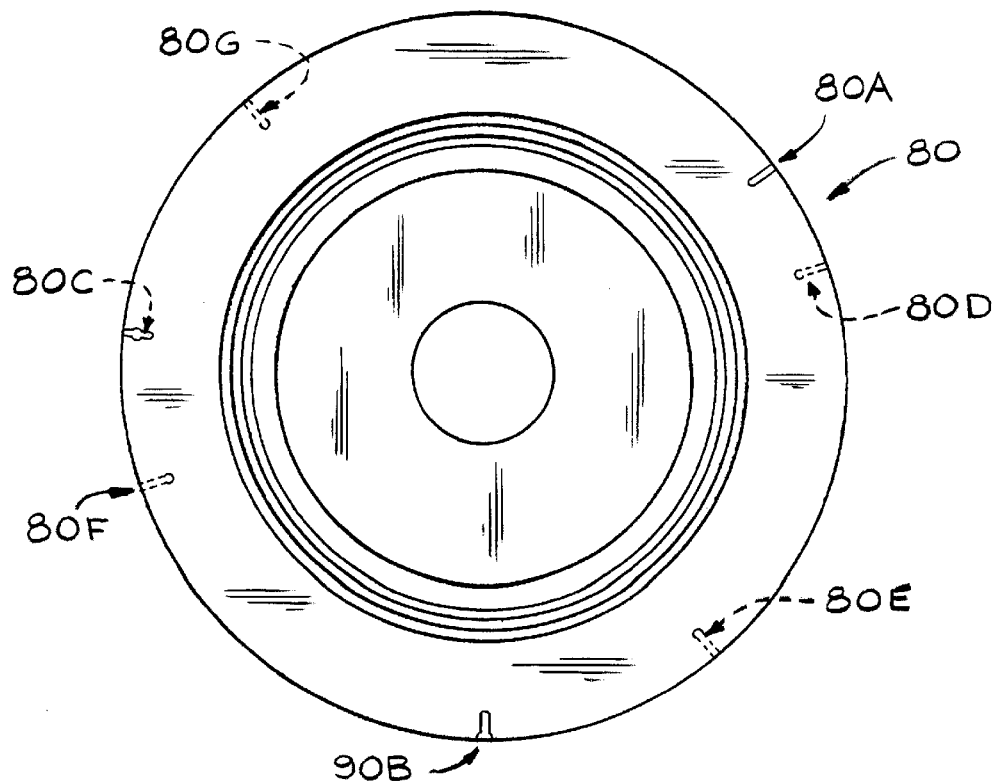

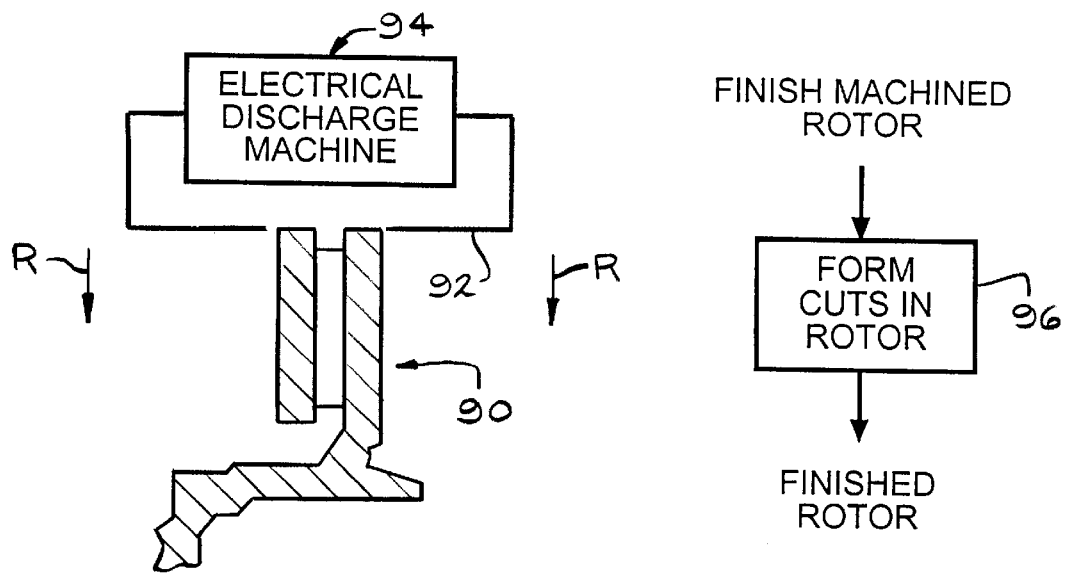
FIG. 21
FIG. 22
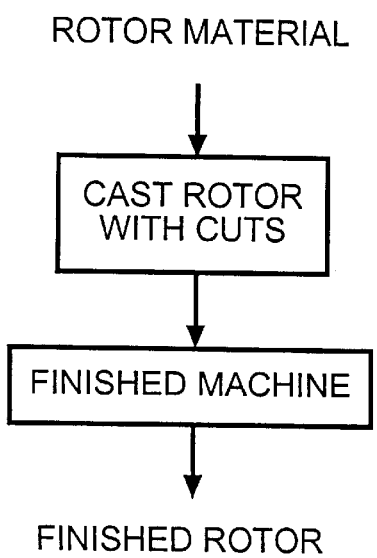
FIG. 23
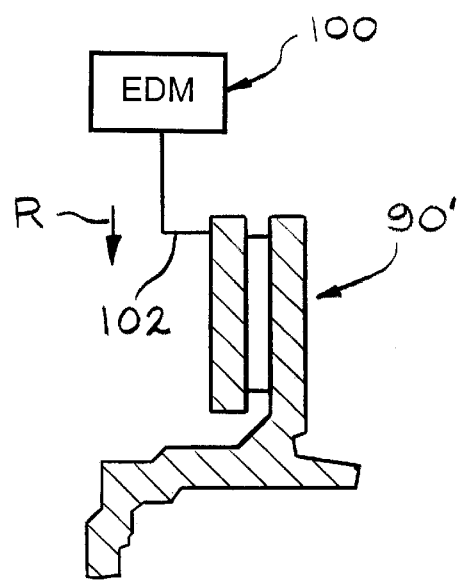
FIG. 24

DISC BRAKE ROTOR AND METHOD FOR PRODUCING SAME

CROSS-REFERENCE TO RELATED APPLICATIONS

This application claims the benefit of U.S. Provisional Application Ser. No. 60/048,589, filed Jun. 4, 1997, and U.S. Provisional Application Ser. No. 60/049,843, filed Jun. 17, 1997.

BACKGROUND OF THE INVENTION

This invention relates in general to vehicle disc brake assemblies and in particular to an improved structure for a brake rotor adapted for use in such a vehicle disc brake assembly and method for producing the same.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. The rotor includes a pair of opposed friction plates which are selectively engaged by portions of a caliper assembly. The caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle. During the frictional engagement of the brake shoes with the friction plates of the rotor, brake noise, commonly referred to as brake "squeal", is produced. Thus, it would be desirable to provide an improved structure for a brake rotor and an improved method for producing such a brake rotor which reduces or eliminates the squeal noise from occurring during braking and yet was simple and inexpensive.

SUMMARY OF THE INVENTION

This invention relates to an improved structure for a brake rotor adapted for use in a vehicle disc brake assembly and method for producing the same. The brake rotor includes a mounting flange and a pair of opposed friction plates spaced apart from one another by a plurality of intermediate fins. The friction plates have generally parallel outwardly facing surfaces adapted to be frictionally engaged by a pair of brake pads of the disc brake assembly. Each of the friction plates defines an outer plate diameter and an inner plate diameter. At least one of the friction plates includes a pair of asymmetrically spaced apart cuts formed therein. The cuts extend radially inwardly from the outer plate diameter toward the inner plate diameter. In a preferred embodiment, cuts are formed in both of the friction plates and the cuts in the one friction plate are identical in spacing, shape, and location to relative to the cuts formed in the other one of the friction One method for producing the brake rotor of this invention includes the steps (a) providing a rotor including a mounting flange and a pair of opposed friction plates spaced apart from one another by a plurality of intermediate fins, the friction plates having generally parallel outwardly facing surfaces adapted to be frictionally engaged by a pair of brake pads of the disc brake assembly; (b) positioning the rotor on a first cutting machine, the first cutting machine including a fixture for rotatably supporting the rotor and a cutting tool supported relative to the fixture and movable in a generally radial direction relative to the fixture, the cutting tool having a tool end; (c) operating the first cutting machine to machine a groove in the outwardly facing surfaces of the friction plates by selectively controlling the first cutting machine to produce a finish machined rotor; (d) positioning the rotor on a second cutting machine; and (e) operating the second cutting machine to machine a pair of asymmetrically spaced apart cuts in at least one of the friction plates.

BRIEF DESCRIPTION OF THE DRAWINGS

FIG. 1 is a schematic view of a first embodiment of a brake rotor constructed in accordance with this invention.

FIG. 2 is an enlarged view of a portion of the brake rotor shown in FIG. 1.

FIG. 4 is a schematic view of a second embodiment of a brake rotor constructed in accordance with this invention.

FIG. 5 is a schematic view of a third embodiment of a brake rotor constructed in accordance with this invention.

FIG. 12 is a schematic view of a sixth embodiment of a brake rotor constructed in accordance with this invention.

FIG. 13 is a schematic view of a seventh embodiment of a brake rotor constructed in accordance with this invention.

FIG. 21 is a schematic view of a first embodiment of an apparatus which can be used to form the cuts in the brake rotor in accordance with this invention.

FIG. 22 is a first sequence of steps which can be used to produce the brake rotor in accordance with this invention.

FIG. 23 is a second sequence of steps which can be used to produce the brake rotor in accordance with this invention.

FIG. 24 is a schematic view of a second embodiment of an apparatus which can be used to form the cuts in the brake rotor in accordance with this invention.

DETAILED DESCRIPTION OF THE PREFERRED EMBODIMENTS

Figure 3:
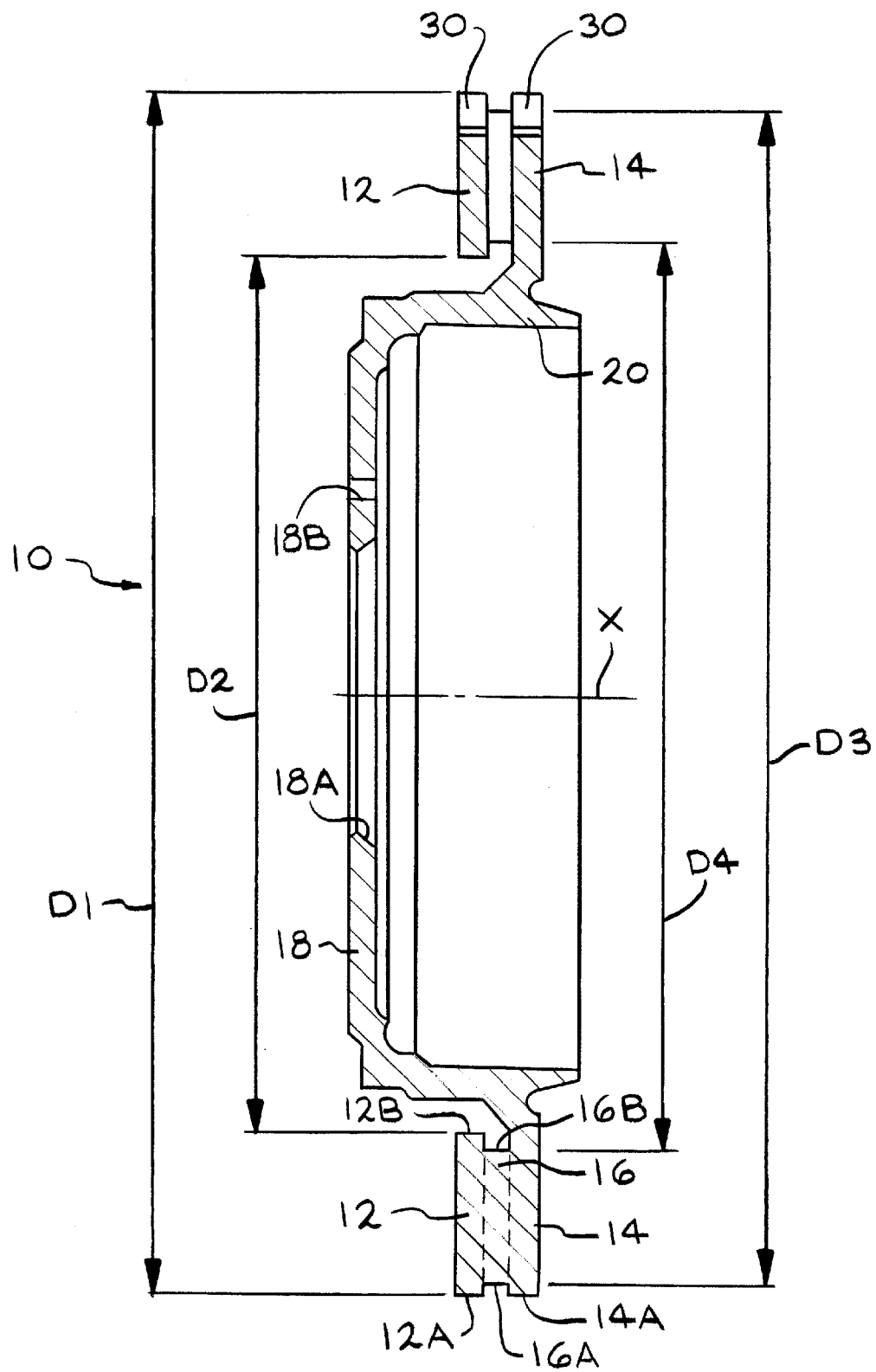
FIG. 3 is a sectional view brake rotor taken along line 3—3 of FIG. 1.
Figure 27:
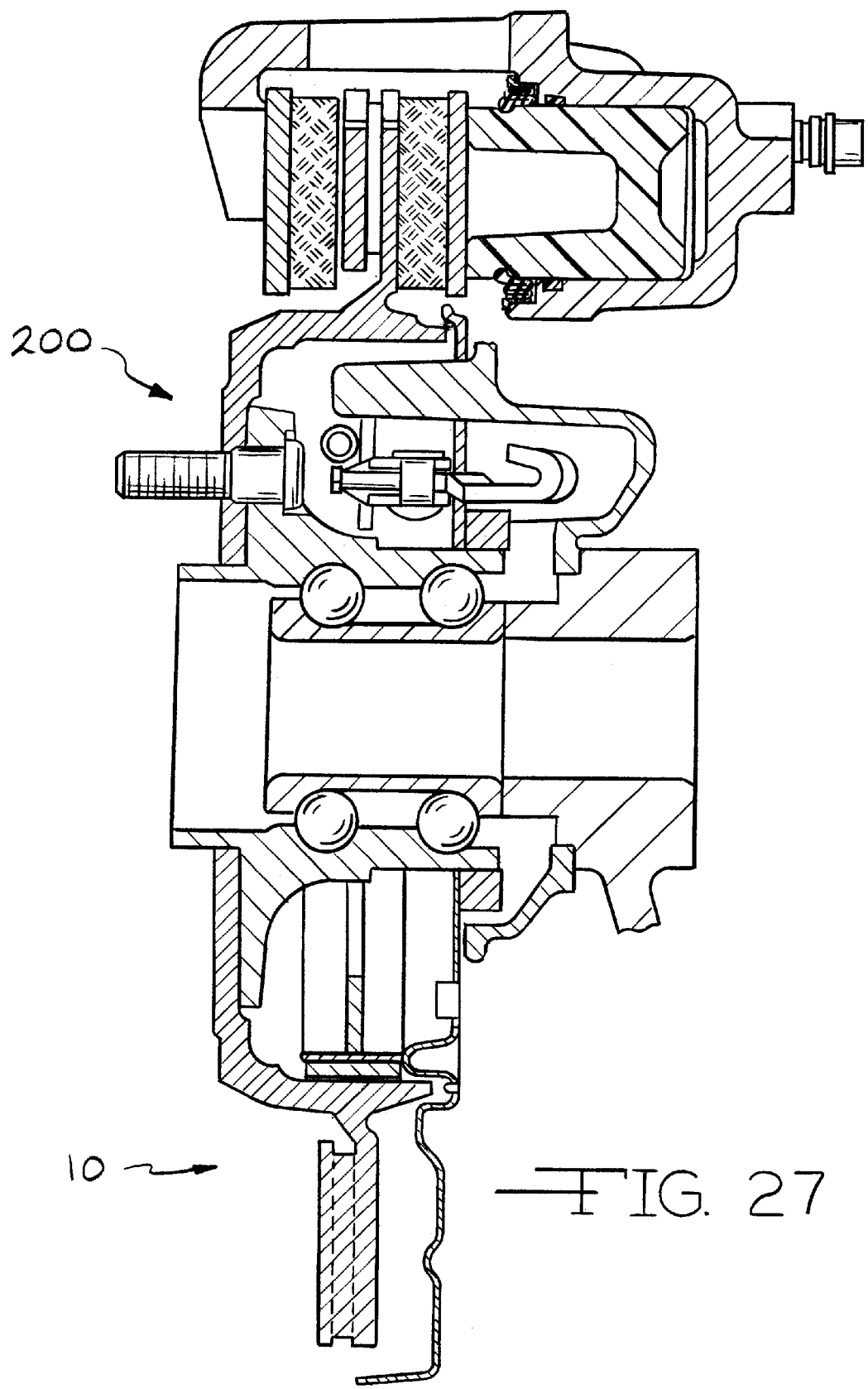
FIG. 27 is a sectional elevational view of a portion of a drum-in-hat type of disc brake assembly including the brake rotor illustrated in FIG. 1.

Referring now to the drawings, there is illustrated in FIGS. 1 through 3 a first embodiment of a brake rotor, indicated generally at 10, in accordance with this invention. The illustrated rotor 10 is adapted for use in a drum-in-hat disc brake assembly, indicated generally at 200 in FIG. 27, the general structure and operation of such a drum-in-hat disc brake assembly 200 is known in the art. The drum-in-hat disc brake assembly 200 is similar to that disclosed in U.S. Pat. No. 5,322,145 to Evans or U.S. Pat. No. 5,180,037 to Evans, the disclosures of which are incorporated herein. Briefly, the drum-in-hat disc brake assembly 200 includes a hydraulically actuated disc service brake and a drum-in-hat parking and emergency brake. Alternatively, the brake rotor 10 can be used in other kinds of disc brake assemblies, including other non drum-in-hat kinds of disc brake assemblies.

As best shown in FIG. 3, the rotor 10 is ventilated and includes a pair of opposed friction plates 12 and 14 which are spaced apart from one another by a plurality of intermediate ribs, fins, or posts 16 in a known manner. The rotor 10 defines an axis X. The entire rotor 10, including the two friction plates 12 and 14 and the intermediate ribs 16, may be cast as a single piece. Preferably, the rotor 10 is cast from an aluminum based metal matrix composite (MMC) containing silicon carbide particulate reinforcement. Such an aluminum MMC is commercially available under the name DURALCAN, a registered trademark of Alcan Aluminum Limited of San Diego, Calif. In a preferred embodiment, the base alloy of the MMC is an aluminum alloy, such as for example A356 aluminum, and the particulate reinforcement of the metal matrix is silicon carbide. However, the base alloy of the MMC can comprise other alloys, such as for example, magnesium or titanium alloys. Also, the particulate reinforcement material can comprise other materials, such as for example, alumina, silicon nitride, graphite, ceramics, or other refractory type materials. In addition, in the preferred embodiment, the silicon carbide particulate reinforcement has a generally spheroidal to semi-spheroidal shape which allows the silicon carbide to be readily mixed with the aluminum alloy and form a mixed composite which is castable. However, the shape of the particulate reinforcement can be of other shapes, such as rods, whiskers, or fibers, to name a few. Furthermore, in the preferred embodiment, the volumetric content of the particulate reinforcement in the rotor insert is in the range of 10% to 30% of the total volumetric content of the composite rotor insert. Alternatively, the rotor 10 may be formed from other materials. For example, the rotor 10 may be formed from grey cast iron, or a composite brake rotor formed from a combination of aluminum and MMC such as disclosed in U.S. Pat. No. 5,509,510 to Ihm, the disclosure of which is incorporated herein.

The rotor 10 further includes an inner mounting flange portion 18 connected to the friction plate 14 by a circumferential wall or hat portion 20. The inner mounting flange portion 18 includes a centrally located pilot hole 18A which defines an axis of rotation for the rotor 10. A plurality of lug bolt receiving holes 18B (one of such lug bolt receiving holes 18B is shown in FIG. 3), are equally spaced circumferentially on the rotor 10 about the pilot hole 18A.

The friction plates 12 and 14 further include outer peripheral ends 12A and 14A, respectively, which define a plate outer diameter D1. The friction plate 12 includes an inner peripheral end 12B which defines a plate inner diameter D2. Each of the ribs 16 includes an outer peripheral end 16A which defines an outer diameter D3, and an inner peripheral end 16B which defines an inner diameter D4. As shown in the embodiment illustrated in FIG. 3, the outer diameter D1 of the friction plates 12 and 14 is greater than the outer diameter D3 of the ribs 16. Also, the inner diameter D2 of the friction plate 12 is less than the inner diameter D4 of the ribs 16.

The rotor 10 further includes a pair of asymmetrical cuts or slits 30 formed therethrough. As shown in this embodiment, the cuts 30 are identical to each other and extend radially inwardly from the outer peripheral ends 12A and 14A of the friction plates 12 and 14, respectively. Preferably, the cuts 30 are formed only through the friction plates 12 and 14 and not through the ribs 16. Alternatively, one or more of the cuts 30 could be formed through an associated rib 16 if desired.

As best shown in FIG. 2, each cut 30 includes a generally narrow first outer cut portion 30A and a generally circular second inner cut portion 30B. The cut 30 extends a predetermined radial distance X1 from the outer peripheral ends 12A and 14A of the friction plates 12 and 14, respectively, to the center of the circular second cut portion 30B.

The first outer cut portion 30A defines a predetermined cut width W1, and the circular second cut portion 30B defines a predetermined diameter D. The radial distance X1 is in the range of about 0.015 inch to about 1.0 inch, the cut width W1 is in the range of about 0.010 inch to about 0.125 inch, and the diameter D is in the range of about 0.020 inch to about 0.250 inch. The cuts 30 are spaced apart from each other by a predetermined angle A, which is in the range of about 5 degrees to about 180 degrees. Preferably, the radial distance X1 is about 0.125 inch to about 0.375 inch, the cut width W1 is about 0.010 inch to about 0.030 inch, the diameter D is about 0.100 inch to about 0.200 inch, and the angle A is about 165 degrees to about 180 degree. More preferably, the radial distance X1 is about 0.250 inch, the cut width W1 is about 0.015 inch, the diameter D is about 0.125 inch, and the angle A is about 173 degrees. Preferably, the cuts 30 are formed by an electric discharge machining process. Alternatively, the cuts 30 can be formed by other suitable processes, such as for example, a conventional machining process. Also, the cuts 30 can be cast in the friction plates of the associated rotor during the casting of the rotor itself. Alternatively, the spacing, the shape, the location, and/or the structure of one or more of the cuts 30 can be other than illustrated.

FIG. 4 illustrates a second embodiment of a brake rotor, indicated generally at 40, in accordance with this invention. In this embodiment, the rotor 40 includes eight identical symmetrically spaced cuts 42 formed therethrough. Alternatively, the spacing, the shape, the location, and/or the structure of one or more of the cuts 42 can be other than illustrated.

FIG. 5 illustrates a third embodiment of a brake rotor, indicated generally at 50, in accordance with this invention. In this embodiment, the rotor 50 includes four identical symmetrically spaced cuts 52 formed therethrough. Alternatively, the spacing, the shape, the location, and the structure of one or more of the cuts 52 can be other than illustrated.

Figure 6:
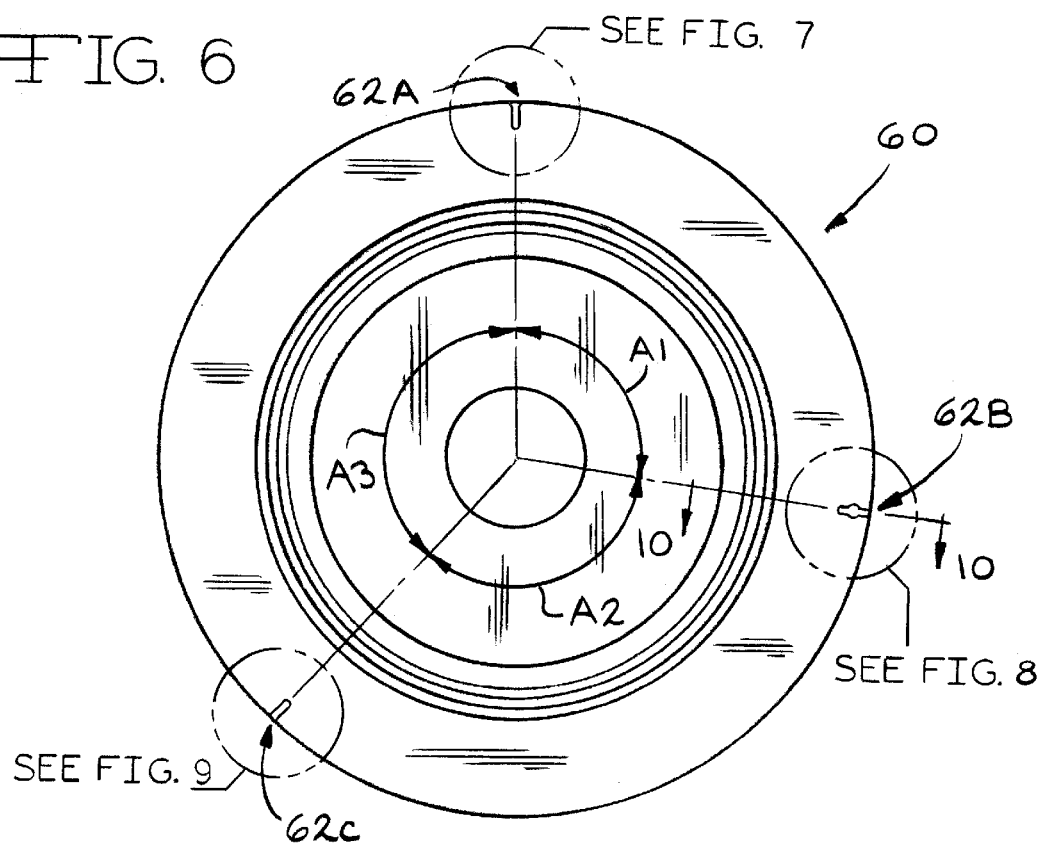
FIG. 6 is a schematic view of a fourth embodiment of a brake rotor constructed in accordance with this invention.
Figure 7:
FIG. 7 is an enlarged view of a portion of the brake rotor illustrated in FIG. 6.
Figure 8:
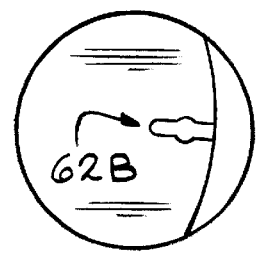
FIG. 8 is an enlarged view of another portion of the brake rotor illustrated in FIG. 6.
Figure 9:
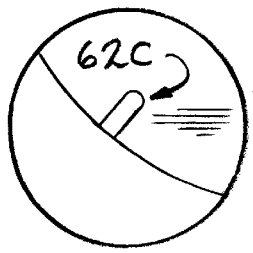
FIG. 9 is an enlarged view of yet another portion of the brake rotor illustrated in FIG. 6.
Figure 10:
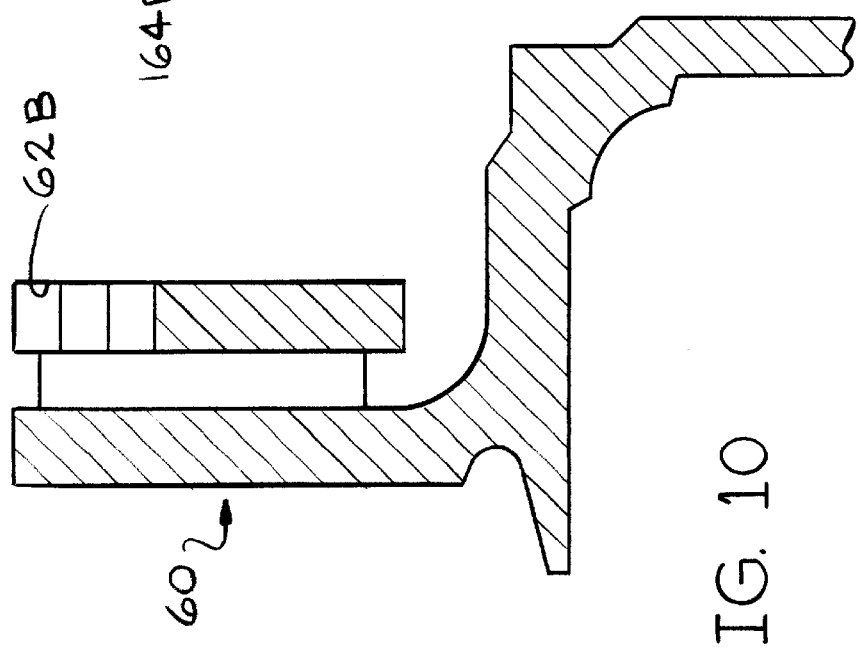
FIG. 10 is an enlarged view of a portion of the brake rotor illustrated in FIG. 6.

FIG. 6 illustrates a fourth embodiment of a brake rotor, indicated generally at 60, in accordance with this invention. In this embodiment, the rotor 60 includes three cuts, namely 62A, 62B, and 62C formed therethrough. The cuts 62A, 62B, and 62C are asymmetrically spaced apart from one another by predetermined angles A1, A2, and A3. In the illustrated embodiment, the angle A1 is approximately 100 degrees, the angle A2 is approximately 120 degrees, and the angle A3 is approximately 140 degrees. As best shown in FIGS. 7, 8, and 9, each of the cuts 62A, 62B, and 62C, respectively, has a shape which is different from that of the others. Also, each of the cuts 62A, 62B, and 62C extends through only one of the associated friction plates of the rotor 60; best shown in FIG. 10 in connection with the cut 62B. Alternatively, the spacing, the shape, the location, and/or the structure of one or more of the cuts 62A, 62B, and 62C can be other than illustrated.

Figure 11:
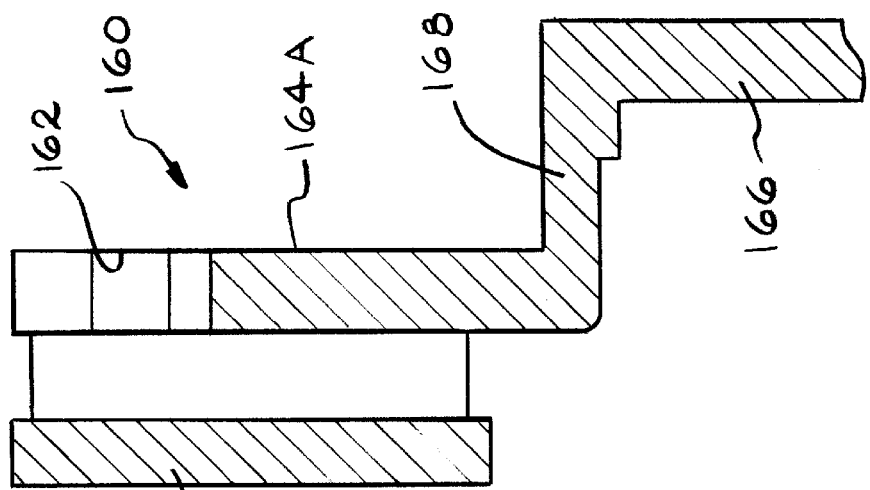
FIG. 11 is an enlarged view of a portion of a fifth embodiment of a brake rotor constructed in accordance with this invention.
Figure 28:
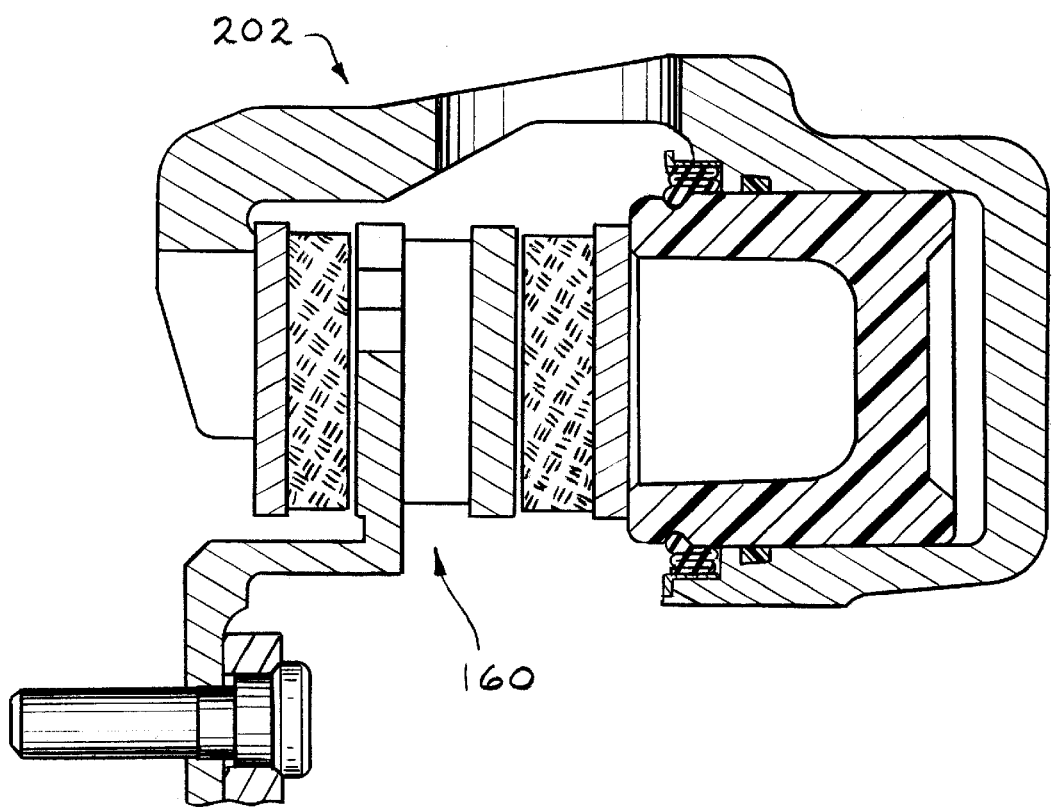
FIG. 28 is a sectional elevational view of a portion of a non drum-in-hat type of disc brake assembly including the brake rotor illustrated in FIG. 11.

FIG. 11 illustrates a fifth embodiment of a brake rotor, indicated generally at 160, in accordance with this invention. The brake rotor 160 is adapted for use in a non-drum-in-hat disc brake assembly, indicated generally at 202 in FIG. 28, the general structure and operation of such a disc brake assembly 202 is known in the art. The disc brake assembly 202 is similar to the "sliding" caliper type of disc brake assembly shown in U.S. Pat. No. 5,542,503 to Dunn et al., the disclosure of which is incorporated herein.

As best shown in FIG. 11, the brake rotor 160 includes a plurality of cuts 162 (only one of such cuts 162 is illustrated) formed through only one of the associated friction plates thereof. In particular, the cuts 162 are formed through an outboard friction plate 164A of the rotor 160. The outboard friction plate 164A being connected to an inner mounting flange portion 166 by a hat portion 168. Alternatively, the rotor 160 could include cuts (not shown) formed through an inboard friction plate 164B thereof FIG. 12 illustrates a sixth embodiment of a brake rotor, indicated generally at 70, in accordance with this invention. The brake rotor 70 is similar to the brake rotor 60 illustrated in FIG. 6 except that the cuts 70A, 70B, and 70C extend through each of the associated friction plates of the rotor 70. Alternatively, the spacing, the shape, the location, and/or the structure of one or more of the cuts 72A, 72B, and 72C can be other than illustrated.

FIG. 13 illustrates a seventh embodiment of a brake rotor, indicated generally at 80, in accordance with this invention. As shown in this embodiment, the brake rotor 80 includes three cuts, namely 80A, 80B, and 80C, formed through one of the associated friction plates of the rotor 80, and four cuts, namely 80D, 80E, 80F, and 80G as shown in phantom, formed through the other one of the associated friction plates of the rotor 80. The cuts 80A, 80B, and 80C are asymmetrically spaced apart from one another and have a shape which is different from that of the others. The cuts 80D, 80E, 80F, and 80G are symmetrically spaced apart from one another and have a shape which is the same as that of the others. Alternatively, the spacing, the shape, the location, and/or the structure of one or more of the cuts 80A, 80B, 80C, 80D, 80E, 80F, and 80G can be other than illustrated.

Figure 14:
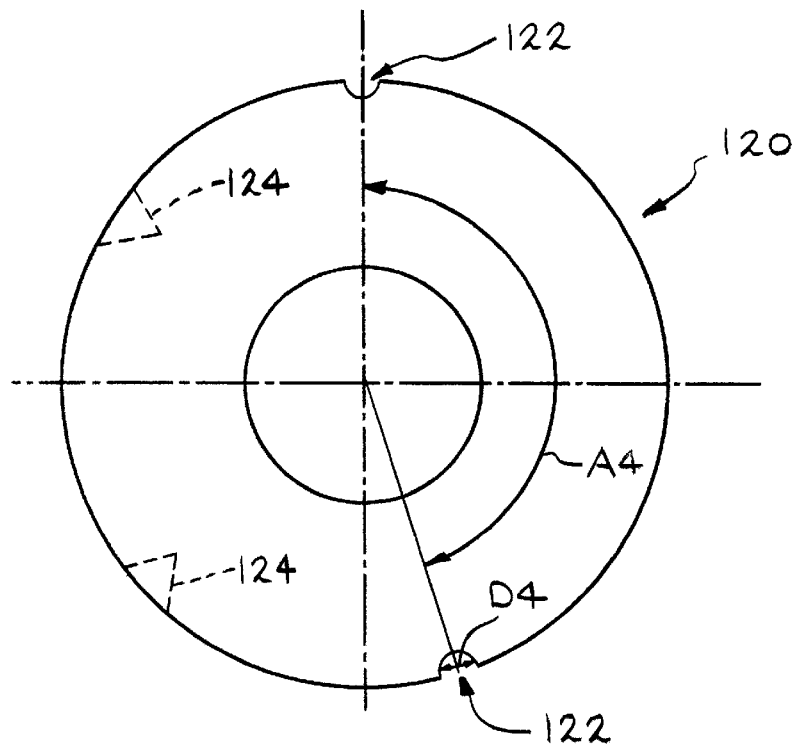
FIG. 14 is a schematic view of an eight embodiment of a brake rotor constructed in accordance with this invention.

FIG. 14 illustrates an eight embodiment of a brake rotor, indicated generally at 120, in accordance with this invention. As shown in this embodiment, the brake rotor 120 includes a pair of asymmetrical cuts 122 formed therethrough. Each of the cuts 122 is of a generally semi-circular shape and defines a predetermined diameter D4. Alternatively, one or both of the cuts 122 can be of a generally wedge shape as shown in phantom at 124. The cuts 122 are spaced apart from each other by a predetermined angle A4. The diameter D4 is in the range of about 0.020 inch to about 0.500 inch, and the angle A4 is in the of about 5 degrees to about 180 degrees. alternatively, the spacing, the shape, the location, and/or the structure of one or more of the cuts 122 can be other than illustrated.

Figure 15:
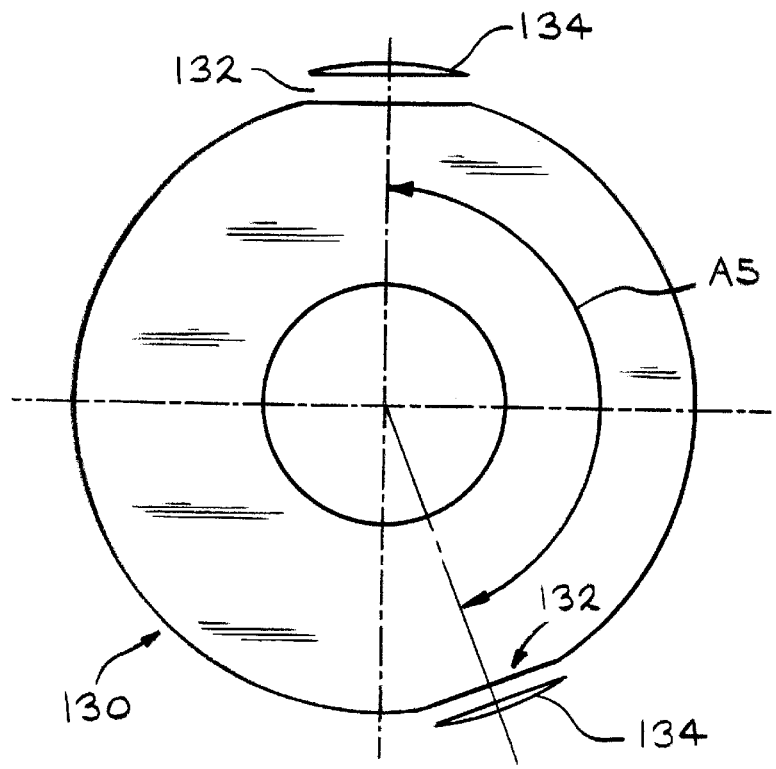
FIG. 15 is a schematic view of a ninth embodiment of a brake rotor constructed in accordance with this invention.
Figure 16:
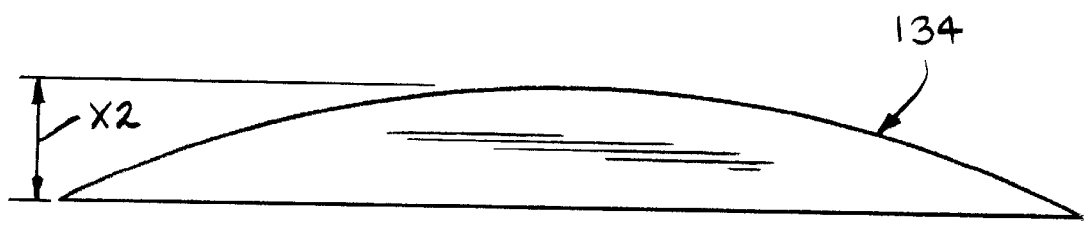
FIG. 16 is a enlarged view of the material removed from the brake rotor illustrated in FIG. 15.

FIG. 15 illustrates a ninth embodiment of a brake rotor, indicated generally at 130, in accordance with this invention. As shown in this embodiment, the brake rotor 130 includes a pair of asymmetrical cuts 132 formed therethrough. Each of the cuts 132 is formed by making a generally tangential cut into the respective friction plate of the brake rotor 130. The cut removes a predetermined section of material 134 from the brake rotor 130. The cuts 132 extend radially to a predetermined radial distance X2 (shown in FIG. 16), and the center of the cuts 132 are spaced apart from each other by a predetermined angle A5. The radial distance X2 is in the range of about 0.015 inch to about 1.0 inch, and the angle A5 is in the of about 5 degrees to about 180 degrees. Alternatively, the spacing, the shape, the location, and/or the structure of one or more of the cuts 132 can be is other than illustrated.

Figure 17:
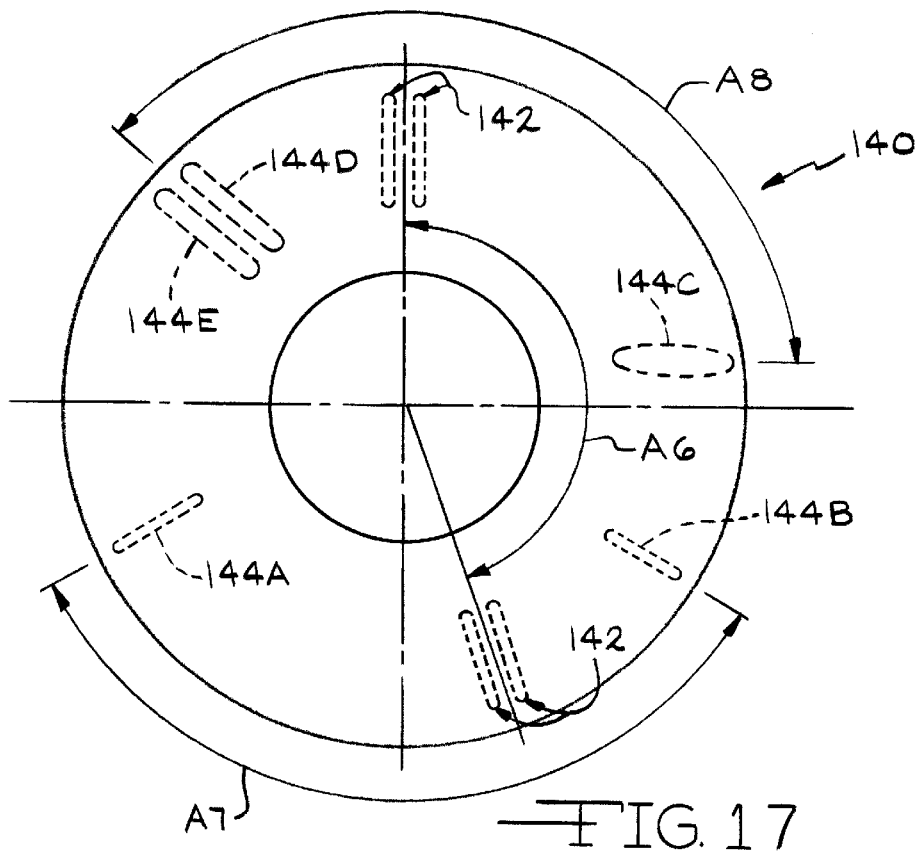
FIG. 17 is a schematic view of a tenth embodiment of a brake rotor constructed in accordance with this invention.
Figures 18, 19:
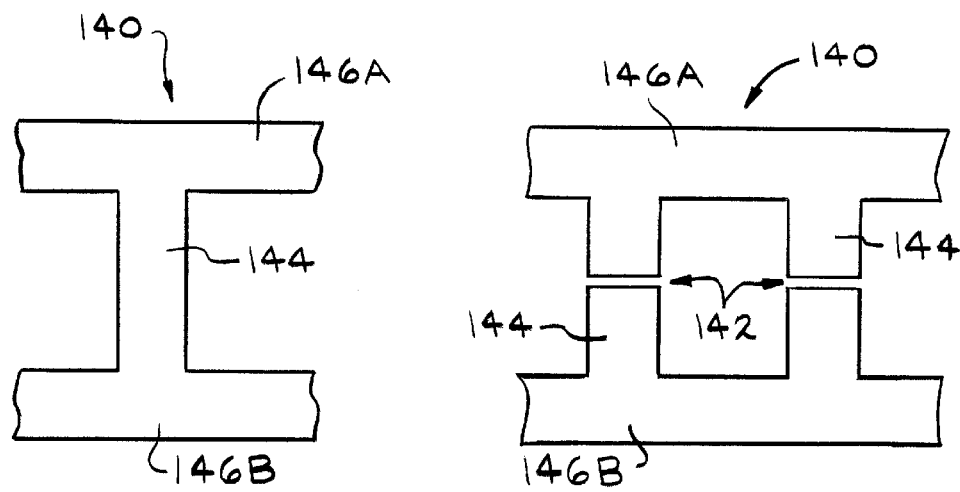
FIG. 18 is an enlarged view of a portion of the brake rotor illustrated in FIG. 17.
FIG. 19 is an enlarged view of another portion of the rotor illustrated in FIG. 17.

FIG. 17 illustrates a tenth embodiment of a brake rotor, indicated generally at 140, in accordance with this invention. The brake rotor 140 includes a pair of friction plates 146A and 146B connected together by a plurality of fins 144. As shown in this embodiment, the brake rotor 140 includes a pair of asymmetrical cuts 142 formed through an adjacent pair of fins 144; the cuts 142 in the fins 144 best shown in FIG. 18. FIG. 19 illustrates a non-cut fin 144 of the rotor 140.

Figure 20:
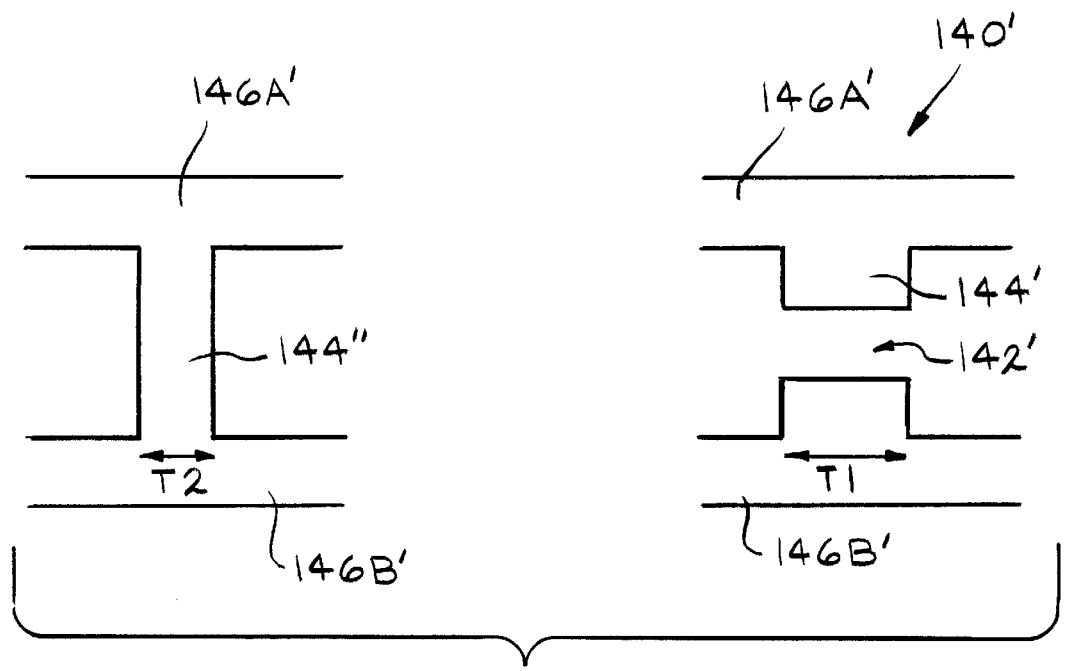
FIG. 20 is an enlarged view of yet another portion of alternate embodiment of the brake rotor illustrated in FIG. 17.

The pairs of fins 144 having the cuts 142 are spaced apart from one another by a predetermined angle A6, which is in the range of about 15 degrees to about 180 degrees. Alternatively, the spacing, the shape, the location, and/or the structure of one or more of the cuts 142 can be other than illustrated. For example, a cut in a single rib 144A can be spaced apart from a cut in a single rib 144B by a predetermined angle A6, and/or a pair of cuts can be formed in a pair of adjacent ribs 144C and 144D and spaced apart from a cut in a single rib 144E by a predetermined angle A8. In addition, as shown in FIG. 20, a brake rotor 140' could include a rib 144' (or ribs) having a cut 142' formed therethrough. As shown therein, the "cut" rib 144' is formed having a thickness or width t1 which is greater than a width t2 defined by the ribs 144 " of the rotor 140' not having the cut 142' formed therethrough. Further, instead of cutting one or more of the fins 144 and 144' of the respective brake rotor 140 and 140', one or more of the fins 144, 144', and 144 " can eliminated during the casting process of the associated brake rotor.

Turning now to FIGS. 21 and 22, a preferred method for producing the associated brake rotors of this invention will now be discussed. Initially, a finish machined rotor, indicated generally at 90 in FIG. 21, is supported on a fixture (not shown). The finish machined rotor 90 can be formed by any suitable process. For example, the rotor 90 can be formed by one of the processes disclosed in U.S. Pat. No. 5,480,007 to Hartford, the disclosure of which is incorporated herein. A pair of wires 92 of an electric discharge machine (EDM), indicated generally at 94, are moved into a predetermined position relative to the outwardly facing surfaces of the friction plates 12 and 14 of the rotor 90, as shown schematically in FIG. 21. Each of the wires 92 is movable in a generally radial direction relative to the friction plates 12 and 14.

Figure 25:
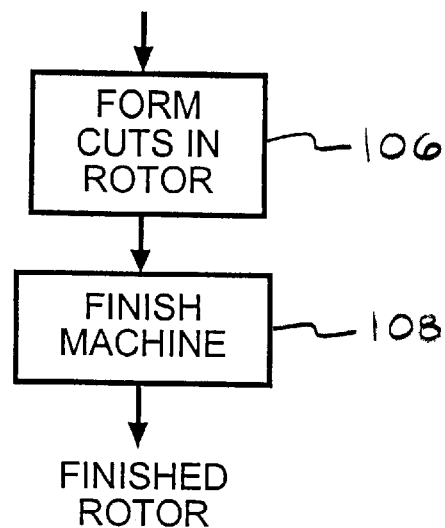
FIG. 25 is a third sequence of steps which can be used to produce the brake rotor in accordance with this invention.
Figure 26:
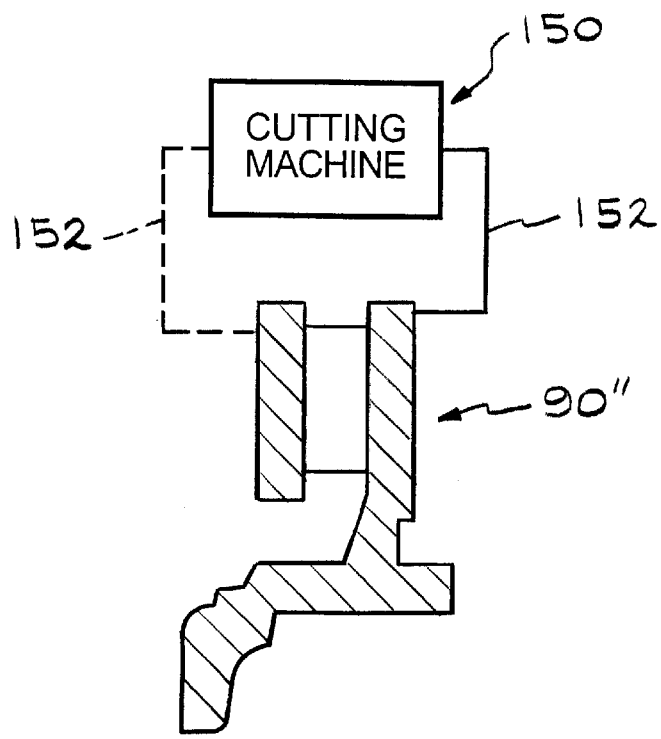
FIG. 26 is a schematic view of a third embodiment of an apparatus which can be used to form the cuts in the brake rotor in accordance with this invention.

In the illustrated embodiment, the wires 92 are operative to machine the desired cuts in the associated friction plates 12 and 14 during step 96. In particular, to form the generally narrow cut portion (e.g., the narrow cut portion 30A shown in FIG. 2), the wires 92 are moved in a generally radially inwardly direction, as indicated by the arrow R, from the outer friction plate diameter to the inner friction plate diameter. In order to form the generally circular cut portion (e.g., the circular cut portion 30B shown in FIG. 2), the wire is oscillated. Alternatively, the movement of one or both of the wires 92 can be other than illustrated. Also, the associated cuts can be formed in the friction plates and/or the fins by other suitable processes. For example, the cuts in the friction plates and/or the fins can be formed by a conventional machining process, or the cuts in the friction plates and/or the ribs can be cast in the associated rotor during the casting of the rotor itself, as shown in FIG. 23. Alternatively, as shown in FIG. 24, an electric discharge machine having a single probe 102 or a pair of probes (not shown) can be utilized to form the desired cuts in the friction plates of the brake rotor 90'. Also, as shown in FIG. 25, the cuts can be initially formed in the rotor during step 106 and, following this, the rotor is finish machined in step 108. In addition, as shown in FIG. 26, a cutting machine 150 having one or two cutting tools 152 can be used to form the cuts in the brake rotor 90". Furthermore, the brake rotor of this invention can include one or more cuts formed in the associated friction plates and/or one or more cuts formed in the associated fins.

While the brake rotor of this present invention has been illustrated and described as being a ventilated full cast rotor, the invention may be used in connection with other types of brake rotors. For example, the invention may be used in connection with a "uni-cast" rotor, wherein the rotor includes an integral hub portion such as shown in U.S. Pat. No. 5,430,926 to Hartford, the disclosure of which is incorporated herein; or in connection with a "composite" rotor, such as shown in U.S. Pat. No. 5,509,510 to Ihm or U.S. Pat. No. 4,930,606 to Sporzynski et al., the disclosures of which are incorporated herein; or in connection with a "solid" rotor (not shown). Also, while the brake rotor of this present invention has been illustrated and described in connection with a drum-in-hat disc brake assembly 200 shown in FIG. 27 and a sliding caliper type of disc brake assembly 202 shown in FIG. 28, the brake rotor may be used with other kinds of disc brake assemblies. For example, the brake rotor of this invention may be used in connection with a "fixed" caliper type of disc brake assembly (not shown).

One advantage of the rotor of this invention is that the associated cuts formed therein improve the dynamic stability of the brake rotor thereby reducing brake squeal noise. In particular, the asymmetrical cuts in the brake rotor make the rotor dynamically more stable. Also, the circular portion of the cuts in the rotor reduces crack initiation and propagation. In addition, the cuts reduce the coning of the brake rotor during braking. Coning is defined as the deflection of the brake rotor during braking.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A rotor adapted for use in a disc brake assembly comprising:

a friction plate defining a friction surface adapted to be frictionally engaged by the disc brake assembly during use, said friction plate defining an outer plate diameter and an inner plate diameter; and at least a pair of asymmetrically spaced apart cuts formed in said friction plate, at least one of said cuts includes a generally semi-circular shape, wherein the rotor includes only two semi-circular shaped cuts formed therethrough, said cuts being spaced apart by an angle in the range from about 5 degrees to about 180 degrees.

2. The rotor defined in claim 1 wherein said cuts extend radially inwardly from said outer plate diameter toward said inner plate diameter.

3. The rotor defined in claim 1 wherein said at least one of said cuts defines a predetermined diameter which is in the range from about 0.020 inch to about 0.500 inch.

4. The rotor defined in claim 1 wherein said cuts are identical to each other.

5. The rotor defined in claim 1 wherein at least one of said cuts includes a generally narrow first outer cut portion and a generally circular second inner cut portion, said first outer cut portion extending radially inwardly from said outer plate diameter a predetermined radial distance to a center of said second inner cut portion and defining a first outer cut width, and said second inner cut portion defining a predetermined second inner cut diameter.

6. The rotor defined in claim 5 wherein said radial distance of said first outer cut portion is in the range from about 0.015 inch to about 1.0 inch, said first outer cut width is in the range from about 0.010 inch to about 0.125 inch, and said second inner cut diameter is in the range from about 0.020 inch to about 0.250 inch, and said cuts are spaced apart from each other by a predetermined angle which is in the range from about 5 degrees to about 180 degrees.

7. The rotor defined in claim 1 wherein said rotor is a ventilated rotor and includes a pair of opposed friction plates spaced apart from one another by a plurality of fins.

8. The rotor defined in claim 7 wherein said cuts only extend through said pair of opposed friction plates.

9. The rotor defined in claim 8 wherein said cuts formed in one of said friction plates are identical in spacing, shape, and location relative to said cuts formed in the other one of said friction plates.

10. The rotor defined in claim 7 wherein said fins are identical to each other.

11. A rotor adapted for use in a disc brake assembly comprising:
- a friction plate defining a friction surface adapted to be frictionally engaged by the disc brake assembly during use, said friction plate defining an outer plate diameter and an inner plate diameter; and
- at least a pair of asymmetrically spaced apart tangential cuts formed in said friction plate.

12. The rotor defined in claim 11 wherein said rotor is a ventilated rotor and includes a pair of opposed friction plates spaced apart from one another by a plurality of fins.

13. The rotor defined in claim 11 wherein said cuts are identical to each other.

14. The rotor defined in claim 11 wherein said cuts extend only through said pair of opposed friction plates.

15. A ventilated rotor adapted for use in a disc brake assembly comprising:
- a pair of opposed friction plates spaced apart from one another by a plurality of fins, each of said friction plates defining a friction surface adapted to be frictionally engaged by the disc brake assembly during use, each of said friction plates defining an outer plate diameter and an inner plate diameter; and
- at least a pair of asymmetrically spaced apart cuts formed in said friction plate, said cuts extending through at least one of said pair of opposed friction plates and through at least a portion of one of said fins.

16. The rotor defined in claim 15 wherein said cuts are identical to each other.

* * * * *